(12) United States Patent  
Bang et al.

(10) Patent No.: US 12,332,426 B2
(45) Date of Patent: Jun. 17, 2025

(54) BEAM STEERING DEVICE (71) Applicant: LG ELECTRONICS INC., Seoul (KR)

(72) Inventors: Hyungseok Bang, Seoul (KR); Seonghong Park, Seoul (KR); Sangchul Lee, Seoul (KR); Chaedeok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 671 days.

(21) Appl. No.: 17/630,300

(22) PCT Filed: Jul. 31, 2019

(86) PCT No.: PCT/KR2019/009537
§ 371 (c)(1),
(2) Date: Jan. 26, 2022

(87) PCT Pub. No.: WO2021/020622
PCT Pub. Date: Feb. 4, 2021

(65) Prior Publication Data
US 2022/0269066 A1 Aug. 25, 2022

(51) Int. Cl.
*G02B 26/06* (2006.01)
*G02B 26/08* (2006.01)
*G02B 27/30* (2006.01)

(52) U.S. Cl.
CPC ......... *G02B 26/06* (2013.01); *G02B 26/0825* (2013.01); *G02B 27/30* (2013.01)

(58) Field of Classification Search
CPC ........ G02B 26/00; G02B 26/02; G02B 26/06; G02B 26/08; G02B 26/005;
(Continued)

(56) References Cited

U.S. PATENT DOCUMENTS 5,222,071 A * 6/1993 Pezeshki ................ B82Y 20/00
372/20
2002/0054727 A1 5/2002 Song
(Continued)

FOREIGN PATENT DOCUMENTS

KR 1020100067087 6/2010
KR 1020180055298 5/2018
(Continued)

OTHER PUBLICATIONS

PCT International Application No. PCT/KR2019/009537, International Search Report dated Apr. 29, 2020, 16 pages.
(Continued)

*Primary Examiner* — Jie Lei
(74) *Attorney, Agent, or Firm* — LEE, HONG, DEGERMAN, KANG & WAIMEY (57) ABSTRACT

The present invention relates to a beam steering device for steering a beam without a physical movement, the beam steering device comprising: a light source unit for irradiating parallel light; and a phase control array for controlling a reflection angle of the parallel light irradiated from the light source unit, wherein the phase control array comprises a plurality of cells in a region where the parallel light is irradiated, and the reflection angle is controlled by controlling the phase of light reflected by each of the plurality of cells.

17 Claims, 11 Drawing Sheets

(58) Field of Classification Search
CPC ............ G02B 26/0825; G02B 26/0833; G02B 26/0808; G02B 27/30; G02B 27/00; G02B 27/0087; G02B 5/08; G02B 5/045; G02F 1/29; G02F 1/295; G02F 1/2955; G02F 1/292; G02F 2203/24; G02F 2201/34; H01Q 3/26; H01Q 3/2676
USPC .... 359/846, 572, 237, 238, 279, 298, 199.2, 359/199.4
See application file for complete search history.

(56) References Cited

U.S. PATENT DOCUMENTS

| | | | |
|---|---|---|---|
| 2009/0257111 A1 | 10/2009 | Heikenfeld et al. | |
| 2012/0188467 A1* | 7/2012 | Escuti | G02F 1/1347 349/1 |
| 2018/0157146 A1* | 6/2018 | Park | G01S 7/4911 |
| 2018/0224709 A1* | 8/2018 | Inada | G02F 1/295 |

FOREIGN PATENT DOCUMENTS

| | | |
|---|---|---|
| KR | 1020190003111 | 1/2019 |
| KR | 1020190019993 | 2/2019 |

OTHER PUBLICATIONS

Korean Intellectual Property Office Application No. 10-2022-7001745, Office Action dated Jan. 22, 2024, 7 pages.

\* cited by examiner

BEAM STEERING DEVICE

CROSS-REFERENCE TO RELATED APPLICATIONS

This application is the National Stage filing under 35 U.S.C. 371 of International Application No. PCT/KR2019/009537, filed on Jul. 31, 2019, the contents of which are hereby incorporated by reference herein their entirety.

TECHNICAL FIELD

The present disclosure relates to a beam steering device. Specifically, the present disclosure relates to a technical field of performing beam steering without physical movement by adjusting a phase of a beam.

BACKGROUND ART

Interest in technologies that can measure a distance or direction to an object using light (beam), identify an object or topography, or detect speed, temperature, material distribution and the like is increasing. In this regard, research has been conducted on a method of steering a direction of light (beam) generated from a light source.

Since a mechanical beam steering method rotates some parts using a motor to control a direction of a beam, there are problems/disadvantages in terms of noise, size (volume), accuracy, etc.

As a representative method of non-mechanical beam steering, there is a micro-electro-mechanical system (MEMS) mirror method, which also has disadvantages in terms of field of view (FOV) and light transmission distance.

In performing analysis and measurement using beam steering, a technology capable of improving performance in various aspects such as accuracy, precision, speed and the like while using a non-mechanical method is required.

DISCLOSURE OF THE INVENTION

Technical Task

One technical task of the present disclosure is to solve the above-described problems and other problems through the specification of the present disclosure.

Another technical task of the present disclosure is to perform beam steering using a non-mechanical method.

Further technical task of the present disclosure is to perform beam steering without physical movement through phase control.

Technical Solutions

In one technical aspect of the present disclosure, provided is a beam steering device, including a light source unit irradiating parallel light and a phase control array controlling a reflection angle of the parallel light irradiated from the light source unit, wherein the phase control array may include a plurality of cells in a region having the parallel light irradiated thereto and wherein the phase control array may control the reflection angle of the parallel light by controlling a phase of the light reflected by each of a plurality of the cells.

The beam steering device may further include a light guide unit providing a path through which the parallel light irradiated from the light source unit passes.

The light guide unit may include the phase control array provided to one side of the light guide unit and an anti-reflection film provided to the other side of the light guide unit, through which light reflected by the phase control array passes, to prevent boundary surface reflection.

The light source unit may include a light source generating to irradiate light and a collimator collecting the light irradiated from the light source to form the parallel light.

The light source may be provided to one side of the light guide unit to irradiate light toward an inside and the collimator may be formed by being grated on the other side of the light guide unit to correspond to a region at which the light irradiated from the light source arrives.

Each of a plurality of the cells may include a reflective plate reflecting incident light and a first medium provided to the reflective plate to vary in a refractive index in response to an applied current or voltage.

The phase control array may control a phase of the light reflected by each of a plurality of the cells by controlling a current or voltage applied to the first medium included in each of the cells.

The phase control array may control the current or voltage applied to the first medium included in each of a plurality of the cells through a common electrode provided to one end of each of a plurality of the cells and an individual electrode provided to the other end of each of a plurality of the cells.

Each of the common electrode and the individual electrode may be formed of a metal material or a doped semiconductor medium.

The common electrode or the individual electrode may be formed of a metal material to perform a function of the reflective plate.

The reflective plate may include a dielectric mirror.

The first medium may have a height D satisfying $2*^{\Delta}n*D >= 2^{\Pi}$ to correspond to a refractive index change $^{\Delta}n$.

A temperature of the first medium may vary in response to the applied current and the refractive index of the first medium may vary in response to the varying temperature.

The first medium may include a material having a finite electric resistance and the temperature may vary by Joule's effect in response to the applied current.

The first medium may include a semiconductor material having a p-n junction structure and the temperature may vary in response to a current applied to the p-n junction structure.

The first medium may include a material having the refractive index varying in response to variability of an electric field generated by the applied voltage.

Advantageous Effects

The effects of a composite sensing device according to the present disclosure will be described below.

The present disclosure may perform beam steering using a non-mechanical method.

The present disclosure may perform beam steering without physical movement through phase control.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In the present application, terms such as "include" or "has" are used herein and should be understood that they are intended to indicate an existence of several components, functions or steps, disclosed in the specification, and it is also understood that greater or fewer components, functions, or steps may likewise be utilized.

Figure 1:
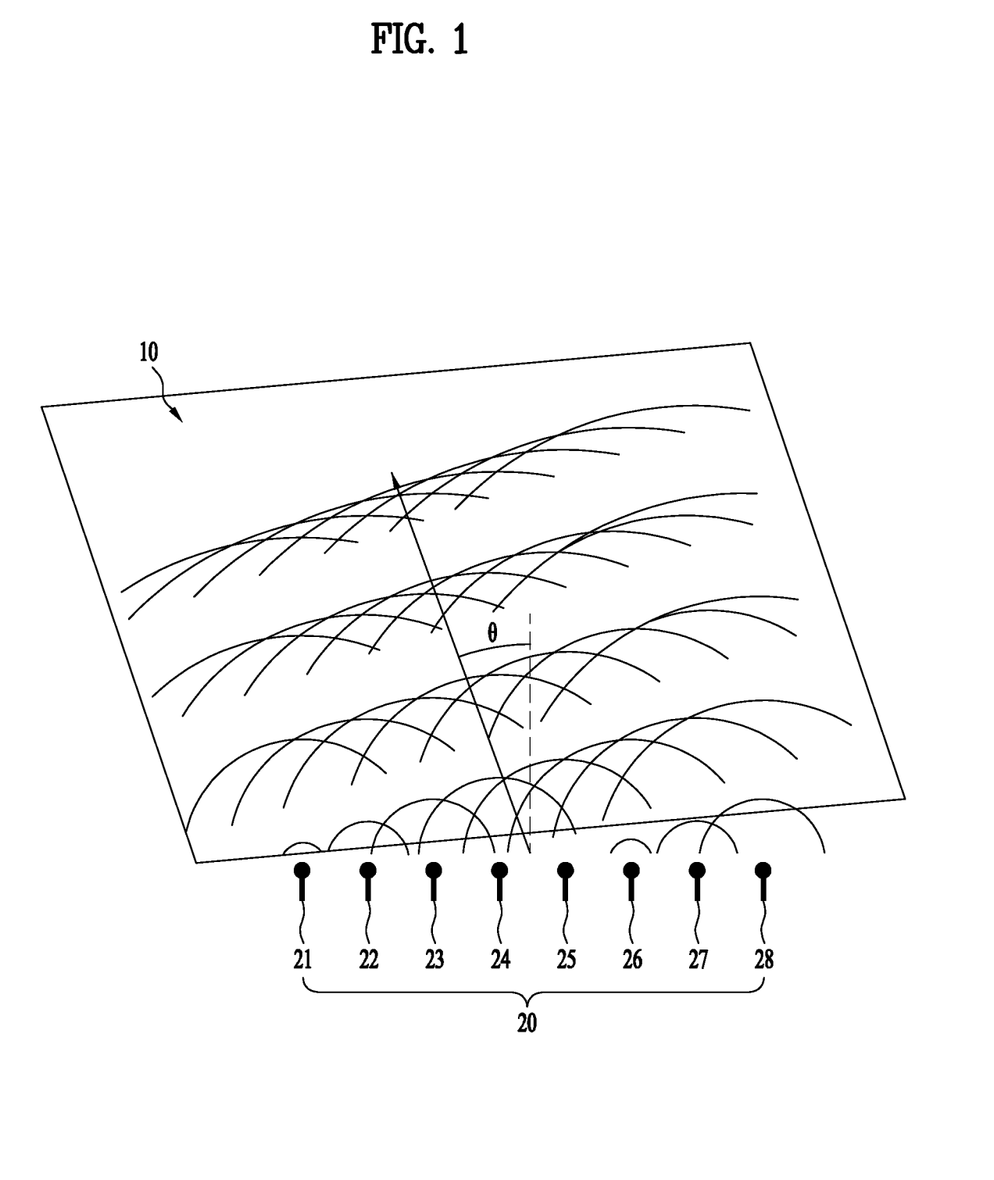
FIG. 1 is a diagram to describe a principle of beam steering by controlling a phase of light.

FIG. 1 is a diagram to describe a principle of beam steering by controlling a phase of light.

Interest in technologies that can measure a distance or direction to an object using light (=beam), identify an object or topography, or detect speed, temperature, material distribution and the like is increasing. In this regard, research has been conducted on a method of steering a direction of light (beam) generated from a light source.

Since a mechanical beam steering method rotates some parts using a motor to control a direction of a beam, there are problems/disadvantages in terms of noise, size (volume), accuracy, etc.

As a representative method of non-mechanical beam steering, there is a micro-electro-mechanical system (MEMS) mirror method, which also has disadvantages in terms of field of view (FOV) and light transmission distance.

Accordingly, discussion on non-mechanical beam steering for performing beam steering by controlling a phase of light is actively underway recently.

The principle of beam steering by controlling a phase of light is as follows. When small element light sources 20 are present in a prescribed area and a phase of light emitted from each of the element light sources 20 can be freely controlled, lights emitted from the element light sources 20 may interfere with each other, whereby a direction and size of a global beam 10 emitted from the area can be controlled. Here, the size of the global beam 10 may correspond to an area through which the global beam 10 passes on a plane vertical to the global beam 10.

For example, when first to eighth element light sources 21 to 28 configuring the element light sources 20 emit lights sequentially by differentiating phases as shown in FIG. 1, the global beam 10 may be inclined at a predetermined angle Θ to correspond to a phase difference of lights generated between the element light sources 20. In addition, when only some of the element light sources 20 generate lights, the size of the global beam 10 may be controlled.

Hereinafter, an embodiment of the existing invention in which beam steering is performed by controlling a light phase will be described in detail.

Figure 2:
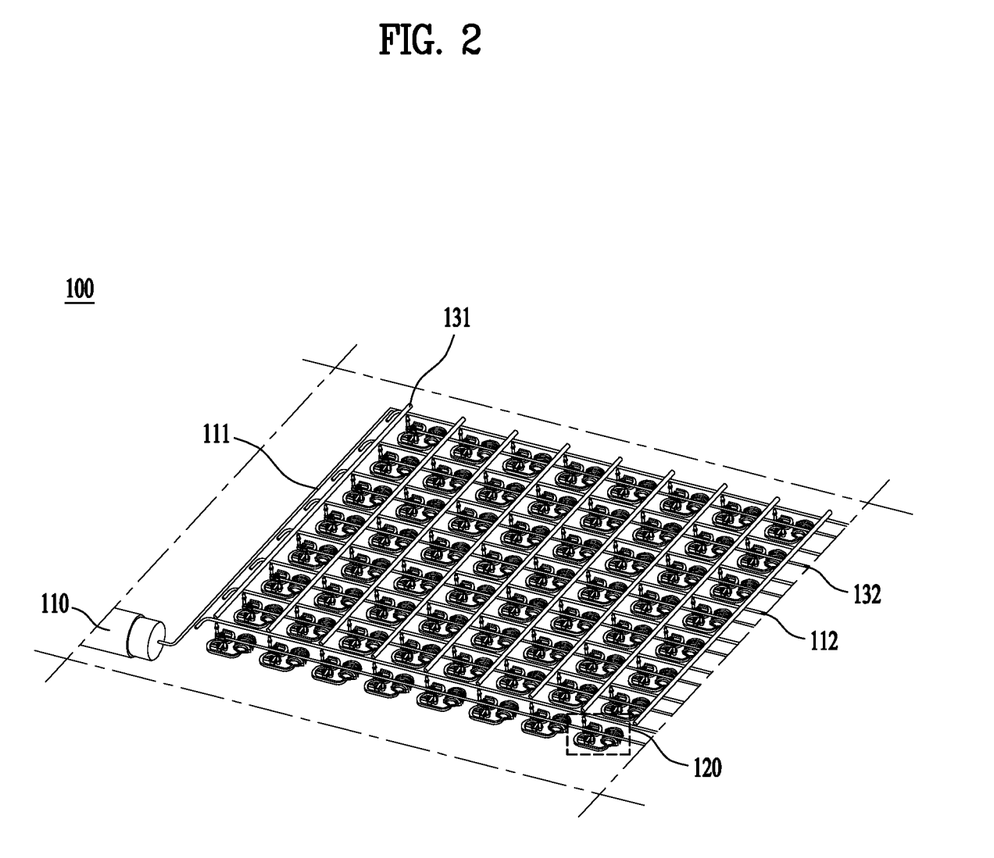
FIG. 2 and FIG. 3 are diagrams to describe an embodiment of the existing invention in which a beam steering is performed by controlling a phase of light.
Figure 3:
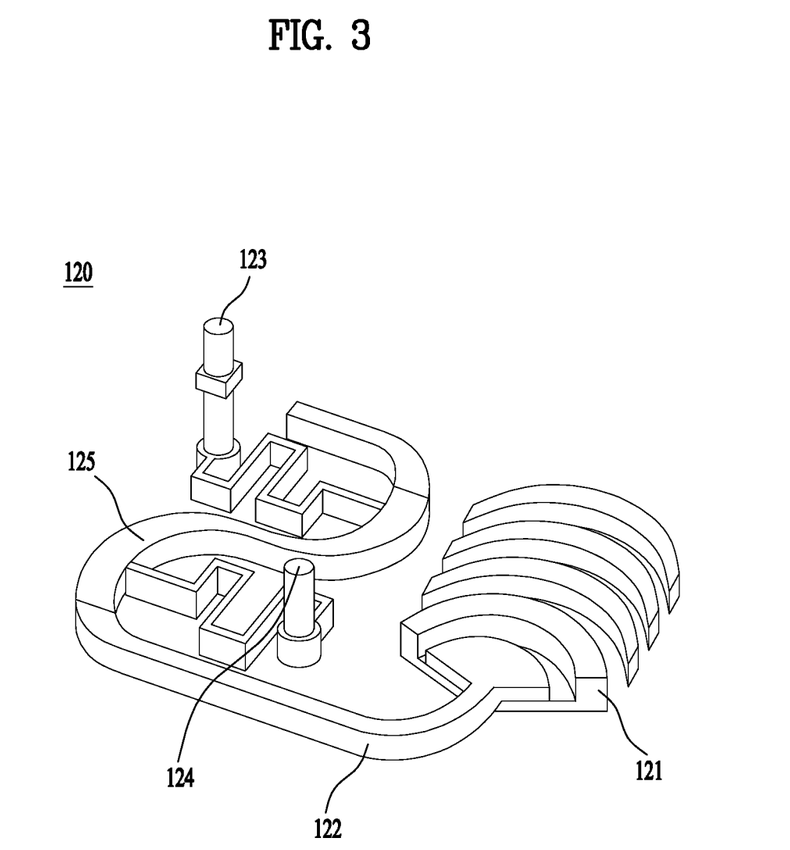

FIG. 2 and FIG. 3 are diagrams to describe an embodiment of the existing invention in which a beam steering is performed by controlling a phase of light. Specifically, FIG. 2 and FIG. 3 show an 8×8 actively tunable optical phase array 100 and a unit cell (pixel) 120.

The optical phase array 100 may include an optical radiation source (in this case, an optical fiber 110 coupled with a laser (not shown)) that sends an optical beam having a free-space wavelength λ0 to a single-mode column bus waveguide 111. In addition, the optical phase array 100 may include a row bus waveguide 112 attenuously coupled to the column bus waveguide 111. The coupling efficiency of the column bus waveguide 111 and the row bus waveguide 112 may vary depending on a coupling position to obtain a predetermined amount (e.g., equivalent amount) of optical power.

The row bus waveguide 112 guides an optical beam from the row bus waveguide 111 to the unit cell (pixel) 120, and each unit cell may have an order of λ0. The unit cell (pixel) 120 is attenuously coupled to the row bus waveguide 112, and each corresponding unit cell 120 may include a silicon waveguide 122 that couples light to a grid substrate antenna element 121. The antenna element 121 may emit light having a preferable amplitude and phase to form a pattern in a long-range field through the optical phase array 100.

The optical phase array 100 may include a pixel addressing matrix for independently varying a phase of a beam emitted by the pixel 120. The pixel addressing matrix is formed of a column control wire 131 and a row control wire 132. The column control wire 131 and the row control wire 132 may be disposed in a parallel plane above the pixel 120 or in a parallel plane below the pixel 120.

The column control wire 131 is electrically coupled to a copper-silicon electrical contact point 123 included in the pixel 120 of a corresponding column. Likewise, the row control wire 132 is electrically coupled to a copper-silicon electrical contact point 124 included in the pixel 120 of a corresponding row. The electrical contact points 123 and 124 in the pixel are electrically coupled to a heater 125 formed by doping a portion of the silicon waveguide 122. The heater 266 may generate heat by Joule efficiency in response to a current applied with finite resistance.

By applying a voltage to a specific column control wire 131 and a specific row control wire 132, a change in potential may be caused across the heater 125 in a specific pixel 120 positioned at an intersection. This potential change causes the heater 125 to change the temperature, resulting in a corresponding change in an optical path length of the doped portion of the silicon waveguide 122 through a thermal-optical effect. In addition, this change in the optical path length causes a corresponding phase change of the optical beam currently propagating through the silicon waveguide 122 to the antenna element 121.

The optical phase array 100 may determine a direction of a beam that finally travels globally according to a combination of phases of lights emitted from the respective pixels 120. However, the optical phase array 100 described in FIG. 2 and FIG. 3 has a problem in that the optical coupling efficiency is very low, and the manufacturing tolerance of the components is a problem in relation to yield and productivity.

Therefore, the present disclosure intends to provide an optical array according to another embodiment.

Figure 4:
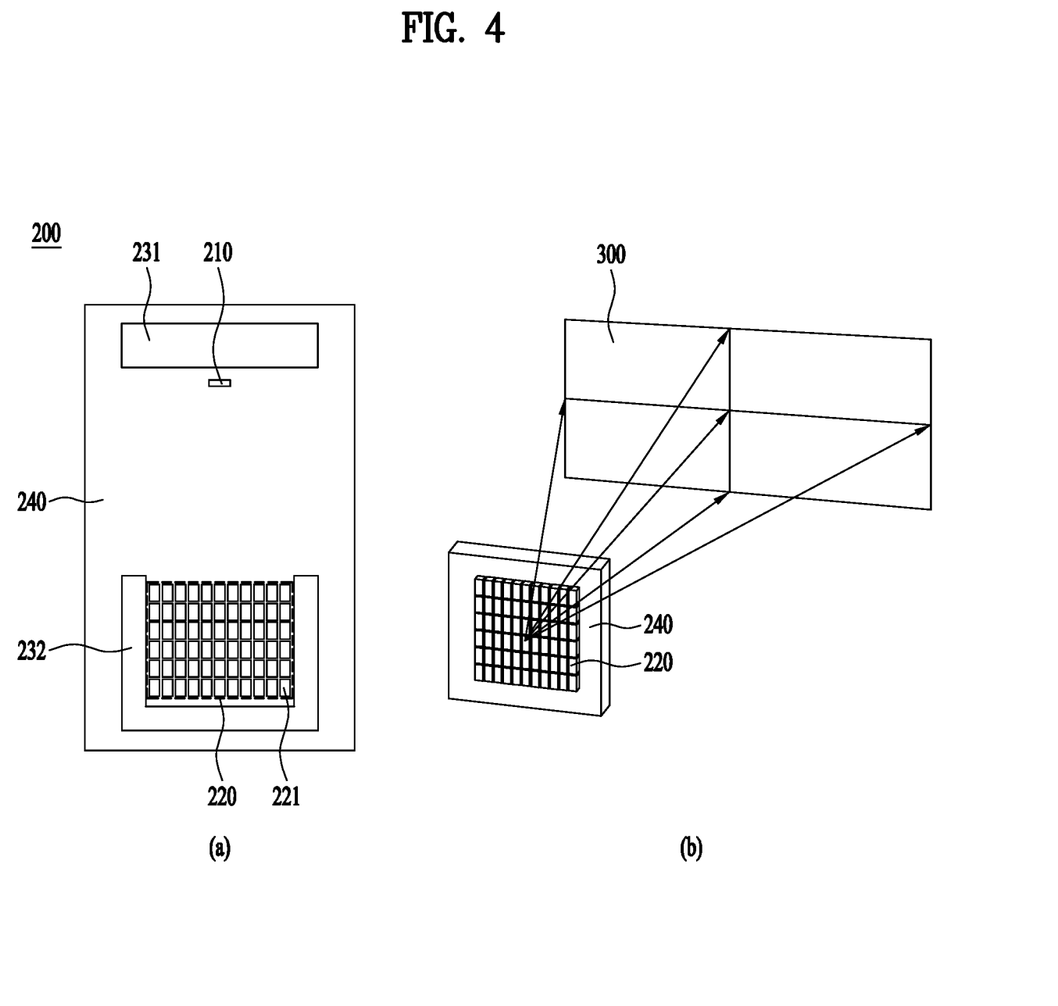
FIG. 4 is a diagram to describe a basic configuration of a beam steering device according to one embodiment of the present disclosure.

FIG. 4 is a diagram to describe a basic configuration of a beam steering device according to one embodiment of the present disclosure. Specifically, FIG. 4 (a) illustrates a basic configuration of beam steering according to the present disclosure, and FIG. 4 (b) illustrates an area in which a beam is steered through a phase control array 220 included in the present disclosure.

The present disclosure is to describe a new embodiment of steering a beam traveling globally by controlling a phase of each element light source. To this end, a beam steering device 200 according to the present disclosure may include a light source unit 210 irradiating light and a phase control array 220 controlling a reflection angle of the light irradiated from the light source unit 210. In addition, the present disclosure may provide a path through which the light irradiated from the light source unit 210 passes and reaches the phase control array 220.

The light source unit 210 of the present disclosure may irradiate parallel light. An embodiment of forming the light irradiated from the light source unit 210 as the parallel light will be described in detail with reference to FIG. 5 and FIG. 6. Light irradiated from the light source unit 210 of the present disclosure may be controlled by a light source unit driver Integrated Circuit (IC) 231.

The phase control array 220 of the present disclosure may include a plurality of cells 221 in a region to which light is irradiated from the light source unit 210. Each of the cells 221 included in the phase control array 220 may be configured to control a phase of reflected light. According to the present disclosure, each cell 221 included in the phase control array 220 may steer a beam reflected globally by controlling a phase of each reflected light. That is, each cell 221 of the present disclosure may function as an element light source like the pixel 120 described in FIG. 2 and FIG. 3.

The phase control array 220 of the present disclosure may include a plurality of cells 221 in a one-dimensional or two-dimensional arrangement. Specifically, FIG. 4 illustrates an embodiment in which the phase control array 220 includes a plurality of the cells 221 according to a two-dimensional arrangement. Each of the cells 221 may have a rectangular shape when viewed from a direction in which light is irradiated, and a horizontal length H and a vertical length V may be different.

The phase control array 220 of the present disclosure does not act as an element for emitting light directly, but may control a phase in reflecting light irradiated from the light source 210 to steer a beam. Specifically, the present disclosure may include a phase control driver IC 232 that controls a phase through each cell of the phase control array 220. The present disclosure may control a region 300 scanned by a beam in a manner of steering the beam through the phase control array 220.

Figure 5:
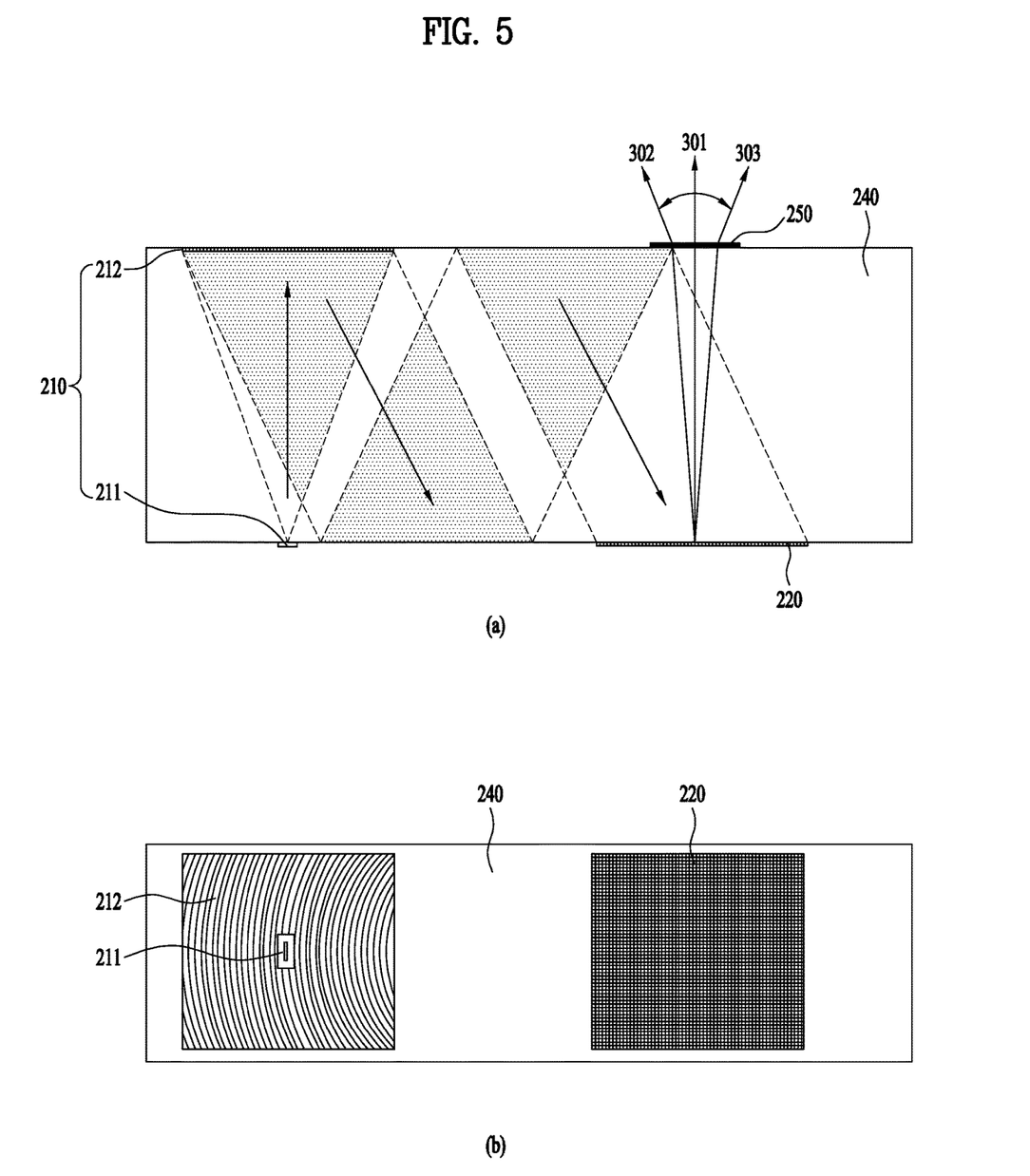
FIG. 5 illustrates a lateral cross-sectional view and a rear view of a beam steering device according to one embodiment of the present disclosure.

FIG. 5 illustrates a lateral cross-sectional view and a rear view of a beam steering device according to one embodiment of the present disclosure. Specifically, FIG. 5 (a) illustrates a lateral cross-sectional view of a beam steering device according to one embodiment of the present disclosure. In addition, FIG. 5 (b) illustrates a rear view of the beam steering device according to one embodiment of the present disclosure.

Figure 6:
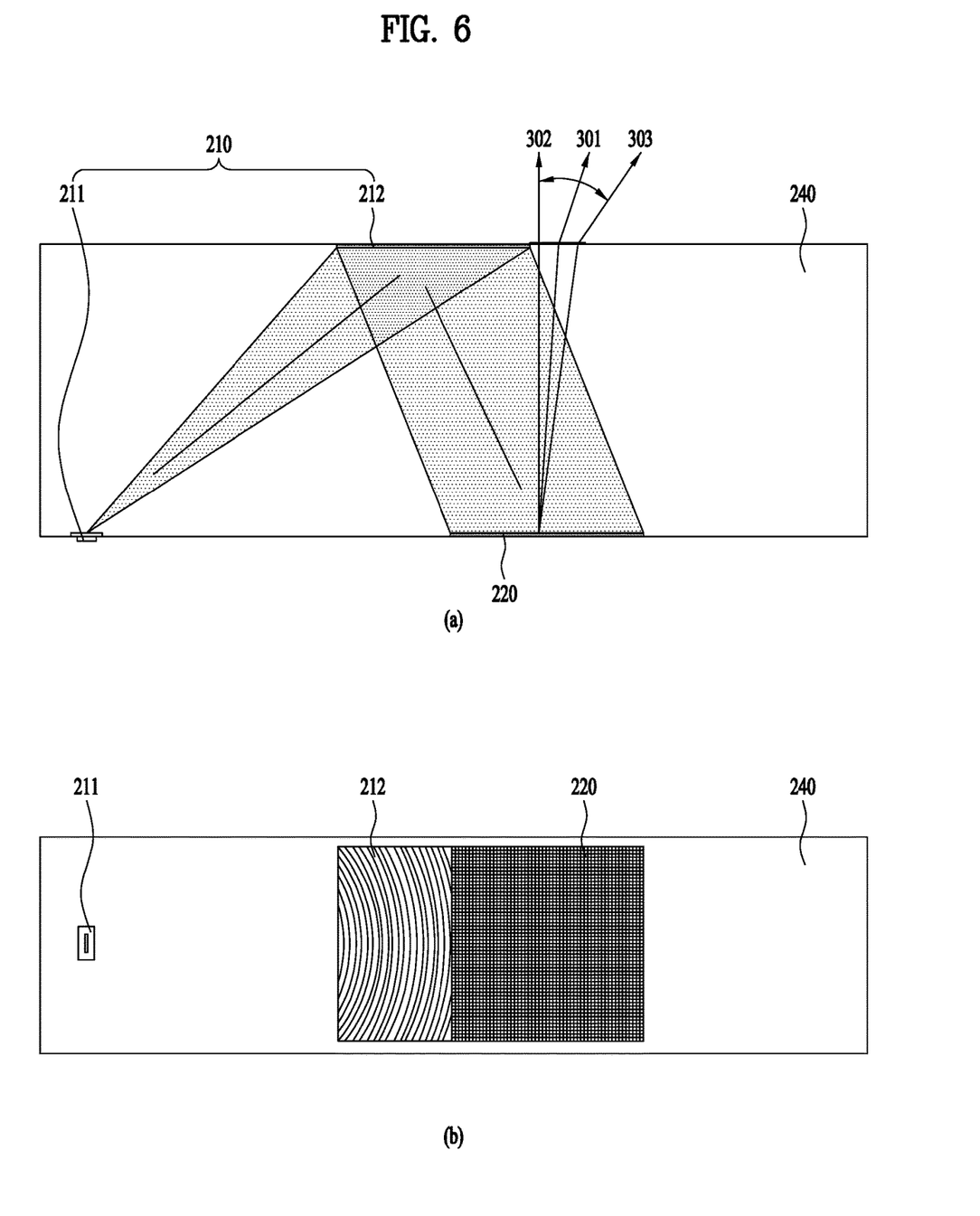
FIG. 6 illustrates a lateral cross-sectional view and a rear view of a beam steering device according to another embodiment of the present disclosure.

FIG. 6 illustrates a lateral cross-sectional view and a rear view of a beam steering device according to another embodiment of the present disclosure. Specifically, FIG. 6 (a) illustrates a lateral cross-sectional view of a beam steering device according to another embodiment of the present disclosure. In addition, FIG. 6 (b) illustrates a rear view of the beam steering device according to another embodiment of the present disclosure.

The present disclosure may include a light guide unit 240 guiding light generated by a light source unit 210 to a phase control array 220. The light guide unit 240 of the present disclosure may provide a path through which light generated by the light source unit 210 passes. Specifically, the light generated by the light source unit 210 may be guided to the phase control array 220 through total reflection inside the light guide unit 240.

The light guide unit 240 of the present disclosure may include a phase control array 220 provided to one side of the light guide unit 240 and an anti-reflection film 250 preventing reflection of a boundary surface by being provided to the other side of the light guide unit 240, through which light reflected by the phase control array 220 passes. The anti-reflection film 250 may prevent light reflected by the phase control array 220 from partially reflecting from the boundary surface when the light passes through the boundary surface of the light guide unit 240 and is then irradiated externally.

The light guide unit 240 may provide a path through which light generated by the light source unit 210 moves by internal total reflection due to a difference from outside in refractive index.

The light source unit 210 of the present disclosure may include a light source 211 that generates light and a collimator 212 that condenses the light generated by the light source 211 to form parallel light. The collimator 212 may be manufactured using a lens or a mirror. In some cases, the collimator 212 may be formed by being grated on the light guide 240.

Specifically, FIG. 5 illustrates an embodiment in which the collimator 212 is formed by being grated on the light guide unit 240. In the present disclosure, the light source 211 is provided to one side of the light guide unit 240 to irradiate light toward an inside of the light guide unit 240 and the collimator 212 formed on the other side of the light guide unit 240 by being grated to correspond to a region to which the light is irradiated. The collimator 212 formed on the other side of the light guide unit 240 may condense the light emitted from the light source 211 to vary into parallel light, and reflect it to be irradiated to the phase control array 220 by total reflection inside the light guide unit 240.

In some cases, the parallel light condensed through the collimator 212 may be directly incident into the phase control array 222 without total reflection inside the light guide unit 240. A related implementation is illustrated in FIG. 6. In the embodiment disclosed in FIG. 6, the description of the common configuration in FIG. 5 is omitted.

The phase control array 220 of the present disclosure may vary an angle of a reflected beam. Specifically, FIG. 5 displays beam paths 301, 302, and 303 reflected by the phase control array 220, respectively.

Figure 7:
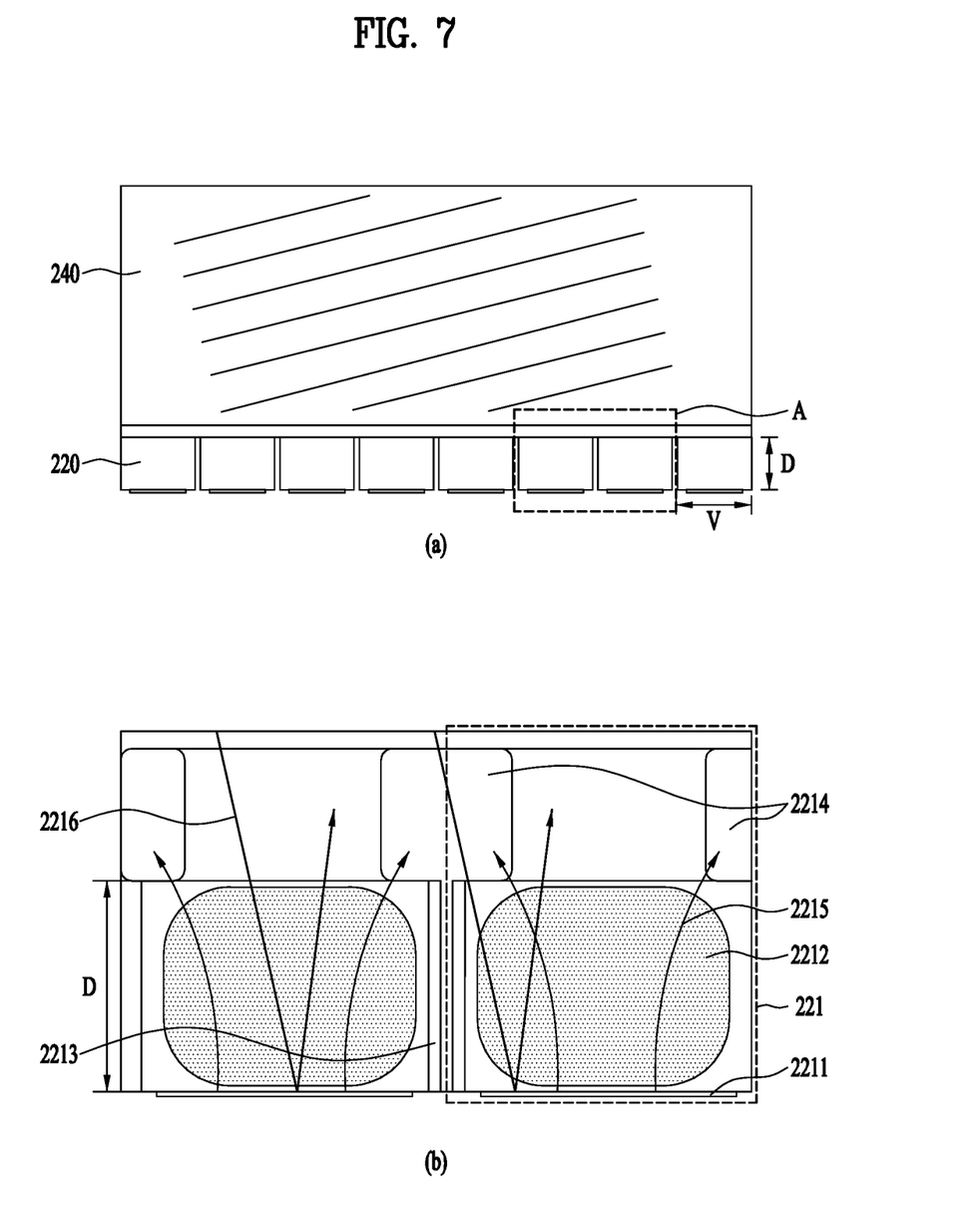
FIG. 7 is a diagram to describe a principle of controlling a phase in a phase control array of the present disclosure.

FIG. 7 is a diagram to describe a principle of controlling a phase in a phase control array of the present disclosure. FIG. 7 (a) illustrates a lateral cross-sectional view of an adjacent portion of the phase control array 220. FIG. 7(b) is a diagram showing an enlarged view of a region A of FIG. 7(a).

A phase control array 220 of the present disclosure may include a plurality of cells 221 respectively controlling phases of incident light. The cell 221 of the phase control array 220 may include a reflective plate 2211 reflecting incident light and a first medium 2212 provided on the reflective plate 2211 and having a refractive index varying in response to a current or voltage applied thereto.

The phase control array 220 of the present disclosure may vary the refractive index of the first medium 2212 included in each of the cells 221 to vary a phase of the light 2216 that is incident on the cells 221 and then reflected.

The phase control array 220 of the present disclosure may control a current 2215 or a voltage applied to the first medium 221 included in each of a plurality of the cells 221, thereby controlling a phase of light reflected by each of a plurality of the cells 221. The present disclosure may include a common electrode 2214 and an individual electrode to apply a current 2215 or a voltage to the first medium 221 included in each of a plurality of the cells 221 of the phase control array 220.

The common electrode 2214 and the individual electrode of the present disclosure may be provided at one end and the other end of each of a plurality of the cells 221. The individual electrode may function as the reflective plate 2211 in some cases. An embodiment of the individual electrode will be described in detail with reference to FIG. 8. In addition, an embodiment of the common electrode 2214 will be described in detail with reference to FIG. 9.

The first medium 2212 of the present invention may have a height D satisfying $2*\Delta n*D \geq 2^\Pi$ corresponding to a refractive index change $\Delta n$. When the height D of the first medium 2212 is satisfied, a phase of incident light incident may be modulated to 0 to $2^\Pi$ according to the refractive index change $\Delta n$ in each cell 221.

The first medium 2212 of the present disclosure may be a material whose temperature varies in response to the applied current 2215, and whose refractive index varies in response to the variable temperature. A scheme in which the temperature of the first medium 2212 varies in response to the applied current 2215 may be as follows. For example, the first medium 2212 of the present disclosure includes a material having a finite electric resistance, and the temperature of the first medium 2212 may be varied by the Joule effect in response to the applied current. In addition, the first medium 2212 of the present disclosure includes a semiconductor material having a PN junction structure, and a temperature of the first medium 2212 may be varied in response to a current applied to the PN junction structure.

In addition, the first medium 2212 of the present disclosure may include a material having a refractive index varying in response to variability of an electric field generated according to an applied voltage.

The present disclosure needs to apply a different current or voltage to the first medium 2212 included in each of a plurality of the cells 221.

Figure 8:
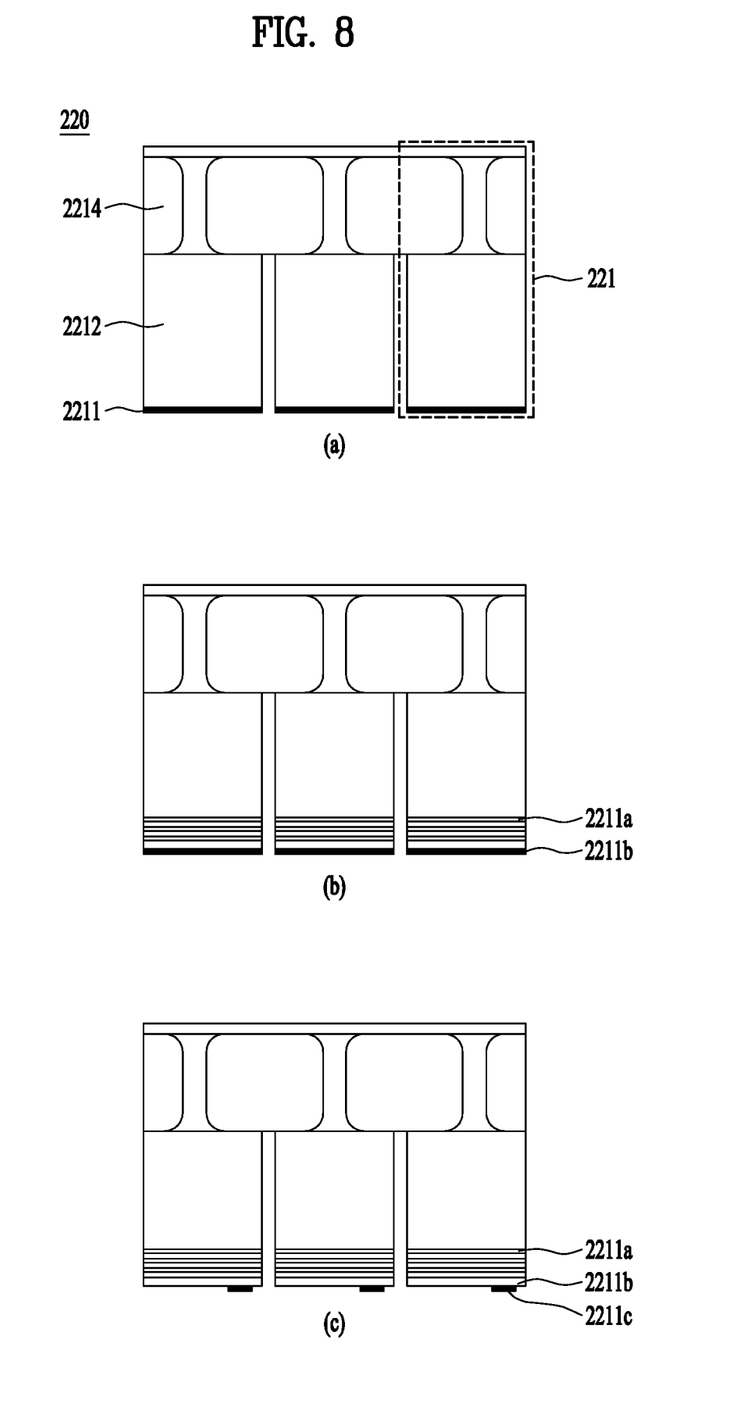
FIG. 8 is a diagram to describe reflective plates and individual electrodes of a plurality of cells in a phase control array of the present disclosure.

FIG. 8 is a diagram to describe reflective plates and individual electrodes of a plurality of cells in a phase control array of the present disclosure.

A phase control array 220 of the present disclosure may include a plurality of cells 221, and each of a plurality of the cells 221 may include a common electrode 2214 and an individual electrode provided to both ends thereof, respectively.

Specifically, FIG. 8 (a) illustrates an embodiment in which a reflective plate 2211 of the present disclosure simultaneously performs an individual electrode function. The reflective plate 2211 of the present disclosure may be made of a metal material, thereby functioning as an individual electrode and performing a mirror function as well.

Specifically, FIG. 8 (b) illustrates an embodiment in which a mirror 2211a and an individual electrode 2211b are separated from each other. Here, the mirror 2211a may include a dielectric mirror comprised of a high refractive index layer and a low refractive index layer.

Specifically, FIG. 8 (c) illustrates an embodiment in which a mirror 2211a and an individual electrode 2211b are separated from each other and in which the individual electrode 2211b contains a doped semiconductor. Specifically, the individual electrode 2211b may include a semiconductor doped so that a large amount of impurities are attached thereto, and may include a ground region 2211c. In addition, like FIG. 8 (b), an embodiment in which a dielectric mirror is used as the mirror 2211a is illustrated.

Figure 9:
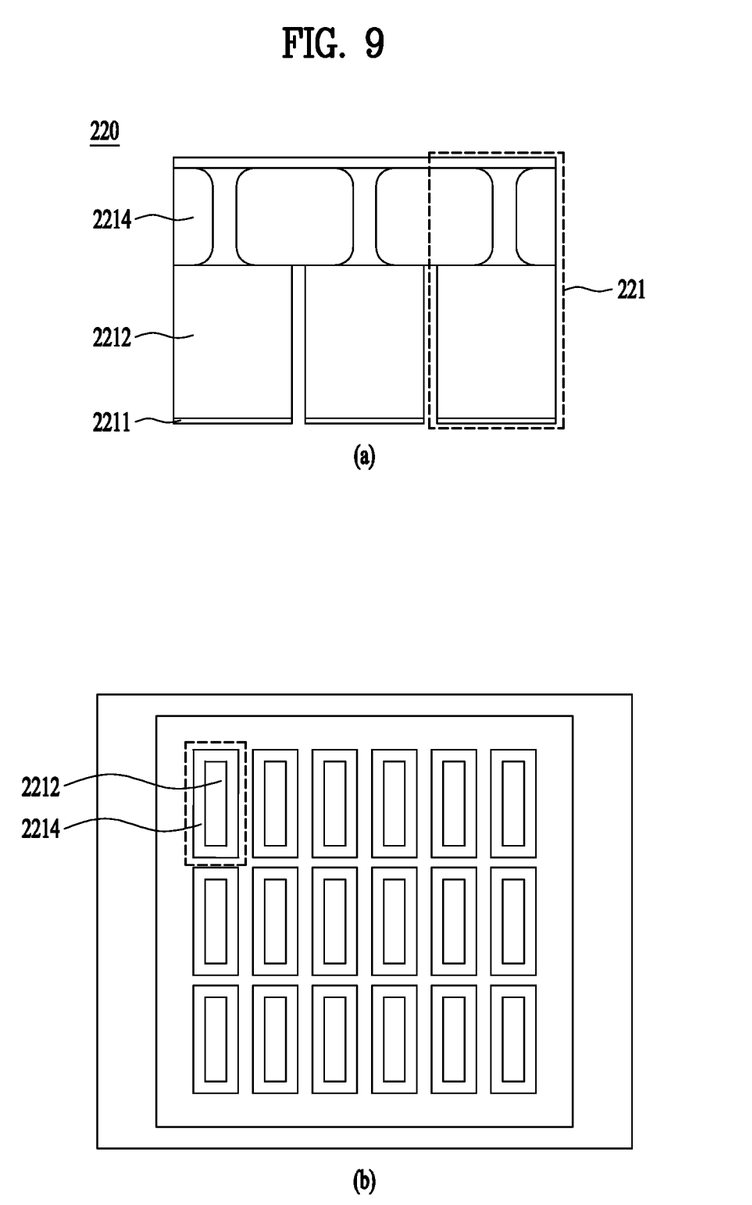
FIG. 9 and FIG. 10 are diagrams to describe common electrodes of a plurality of cells in a phase control array of the present disclosure.
Figure 10:
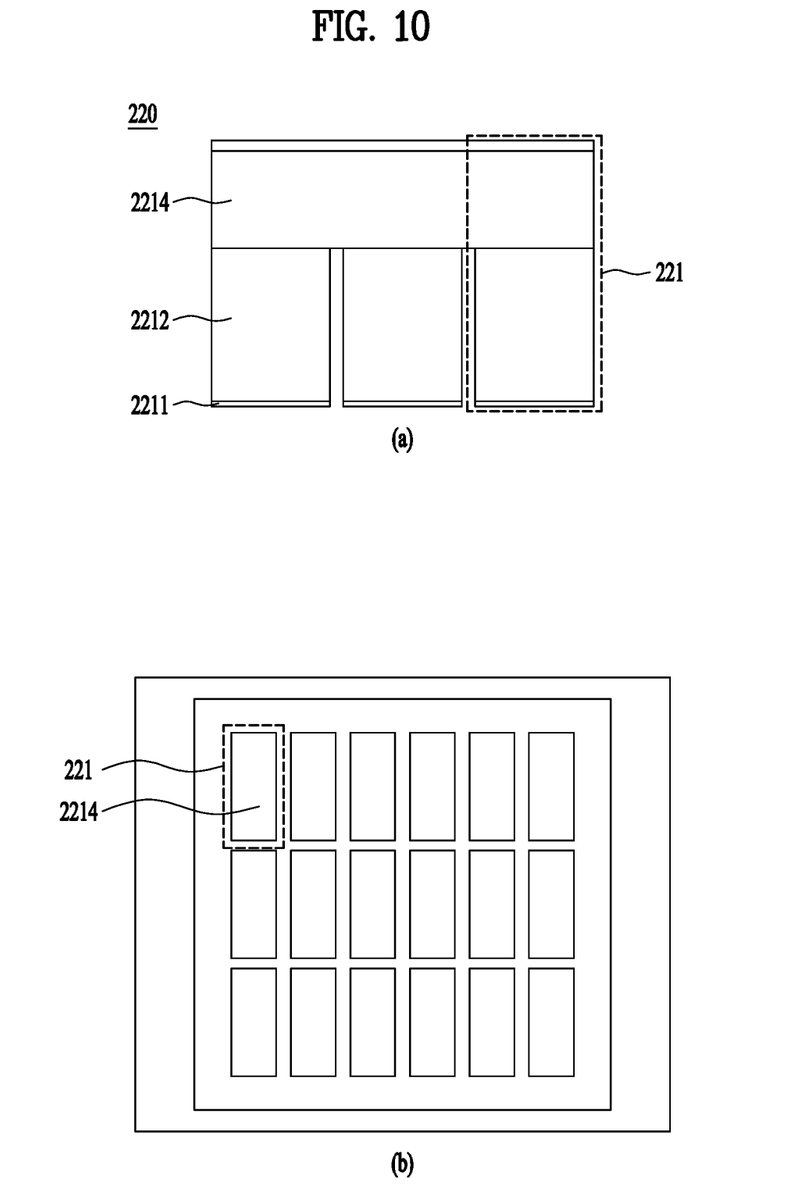

FIG. 9 and FIG. 10 are diagrams to describe common electrodes of a plurality of cells in a phase control array of the present disclosure.

The present disclosure may include two types of common electrodes 2214 for a phase control array 220. In this regard, FIG. 9 illustrates one embodiment, and FIG. 10 illustrates another embodiment. Specifically, FIG. 9 (a) and FIG. 10 (a) illustrate lateral cross-sectional views of the phase control array 220 corresponding to the embodiments, respectively. In addition, FIG. 9 (b) and FIG. 10 (b) illustrate front views of the phase control array 220 corresponding to the embodiments, respectively.

The phase control array 220 of the present disclosure may include a common electrode 2214 provided to a front surface of each cell 221, and may be provided such that the common electrode 2214 covers a portion of the front surface of each cell 221. Specifically, FIG. 9 illustrates an embodiment in which the common electrode 2214 is provided in a grid shape corresponding to a plurality of cells 221. That is, when the phase control array 220 is viewed from a front side, a first medium 2212 may be observed in between the grid-shaped common electrode 2214.

The phase control array 220 of the present disclosure may include a common electrode 2214 on a front surface of each cell 221, and may be provided such that the common electrode 2214 entirely covers the front surface of each cell 221. Specifically, FIG. 10 illustrates an embodiment in which the common electrode 2214 covers all front surfaces of a plurality of cells 221. That is, when the phase control array 220 is viewed from a front side, only the common electrode 2214 may be observed, and the first medium 2212 may not be exposed.

When the common electrode 2214 is provided in the grid shape like FIG. 9, it may be advantageous in light yield. As the common electrode 2214, a transparent electrode may be used, but it may be advantageous in terms of light yield to partially expose the first medium 2212.

When the common electrode 2214 covers all the front surfaces of a plurality of the cells 221 like FIG. 10, it may be easier to control a refractive index of the first medium 2212. This may be advantageous in controlling the refractive index more precisely and steering a beam by uniformly applying current and voltage to the first medium 2212.

Figure 11:
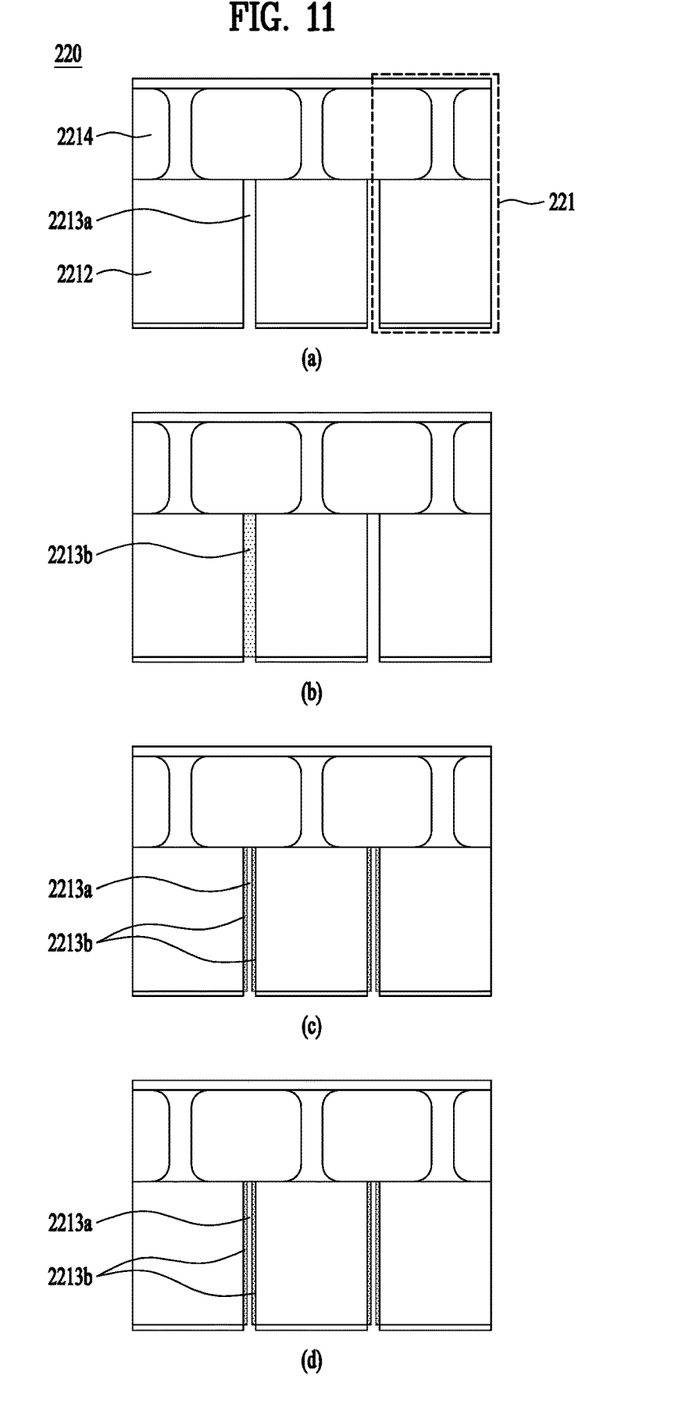
FIG. 11 is a diagram to describe a structure for separating a plurality of cells in a phase control array of the present disclosure.

FIG. 11 is a diagram to describe a structure for separating a plurality of cells in a phase control array of the present disclosure.

A phase control array 220 of the present disclosure may include a plurality of cells 221. Each of a plurality of the cells 221 may include a first medium 2212, and different currents or voltages may be applied to the first mediums 2212 of a plurality of the cells 221, respectively. Accordingly, the first medium 2212 included in one cell 221 needs to be electrically insulated from the first medium 2212 included in the adjacent cell 221. In addition, the first medium 2212 may be a material whose temperature varies in response to the applied current and whose refractive index varies in response to the varying temperature. That is, the first medium 2212 included in one cell 221 needs to be insulated from the first medium 2212 included in the adjacent cell 221 so as not to affect each other.

To this end, the present disclosure may include a second medium 2213 of a non-conductor between the first medium 2212 included in one cell 221 and the first medium 2212 included in the adjacent cell 221. The second medium 2213 may correspond to an air or vacuum state 2213a as shown in FIG. 11 (a). In addition, the second medium 2213 may include a dielectric and insulating material 2213b as shown in FIG. 11 (b). In addition, the second medium 2213 may have a configuration including an air or vacuum state 2213a between the dielectric and insulating materials 2213b. In addition, the second medium 2213 may include a material 2213c that fills a gap between the dielectric and insulating materials 2213b.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A beam steering device, comprising:
   a light source device irradiating parallel light; and
   a phase control array controlling a reflection angle of the parallel light irradiated from the light source device,
   wherein the phase control array includes:
      a plurality of cells in a region thereof having the parallel light irradiated thereto, and
      a common electrode provided to one end of each of the plurality of the cells and covering at least a portion of a front surface of the plurality of cells,
   wherein the phase control array controls the reflection angle of the parallel light by individually controlling a phase of a portion of the light reflected by each of a plurality of the cells,
   wherein the plurality of cells include:
      a first cell; and
      a second cell located by being spaced apart from the first cell, and
   wherein the common electrode covers both at least a portion of a front surface of the first cell and at least a portion of a front surface of the second cell.

2. The beam steering device of claim 1, further comprising a light guide device providing a path through which the parallel light irradiated from the light source device passes.

3. The beam steering device of claim 2, wherein the light guide device comprises the phase control array provided to one side of the light guide device and an anti-reflection film provided to the other side of the light guide device, through which light reflected by the phase control array passes, to prevent boundary surface reflection.

4. The beam steering device of claim 2, the light source device comprising:
   a light source generating to irradiate light; and
   a collimator collecting the light irradiated from the light source and forming the parallel light.

5. The beam steering device of claim 4,
   wherein the light source is provided to a first side of the light guide device to irradiate light toward an inside, and
   wherein the collimator has a from of a grate and is located on a second side of the light guide device so as to correspond to a region at which the light irradiated from the light source arrives.

6. The beam steering device of claim 1, wherein each of a plurality of the cells comprises:
   a reflective plate reflecting incident light;
   and a first medium provided to the reflective plate and having a refractive index that varies in response to a current or voltage applied by the common electrode.

7. The beam steering device of claim 6, wherein the phase control array controls a phase of the light reflected by each of the plurality of cells by controlling a current or voltage applied to the first medium included in each of the cells.

8. The beam steering device of claim 7, wherein the phase control array controls the current or voltage applied to the first medium included in each of the plurality of the cells through the common electrode and an individual electrode provided to the other end of each of the plurality of the cells.

9. The beam steering device of claim 8, wherein each of the common electrode and the individual electrode is formed of a metal material or a doped semiconductor medium.

10. The beam steering device of claim 8, wherein the common electrode or the individual electrode is formed of a metal material to perform a function of the reflective plate.

11. The beam steering device of claim 8, wherein the reflective plate includes a dielectric mirror.

12. The beam steering device of claim 6,
   wherein the first medium has a height D, and
   wherein the phase control array controls the reflection angle of the parallel light by individually controlling a phase of a portion of the light reflected by each of the plurality of the cells based on at least one of the height D and a refractive index change $\Delta n$ of the first medium.

13. The beam steering device of claim 6, wherein a temperature of the first medium varies in response to the applied current and the refractive index of the first medium varies in response to the varying temperature.

14. The beam steering device of claim 13, wherein the first medium includes a material having a finite electric resistance and wherein the temperature varies by Joule's effect in response to the applied current.

15. The beam steering device of claim 13, wherein the first medium includes a semiconductor material having a p-n junction structure and wherein the temperature varies in response to a current applied to the p-n junction structure.

16. The beam steering device of claim 6, wherein the first medium includes a material having the refractive index varying in response to variability of an electric field generated by the applied voltage.

17. The beam steering device of claim 6, wherein the phase control array includes a second medium of a nonconductor provided between the first mediums to separate the plurality of the cells.

* * * * *